United States Patent [19]

Novák et al.

[11] 4,382,070

[45] May 3, 1983

[54] PROCESS FOR PRODUCING XEROGEL OF SILICIC ACID WITH HIGH VOLUME OF PORES

[76] Inventors: Ivan Novák, No. 7 Pod Rovnicami; Dusan Berek, No. 27 Fucikova, both of Bratislava, Czechoslovakia

[21] Appl. No.: 335,094

[22] Filed: Dec. 28, 1981

Related U.S. Application Data

[63] Continuation-in-part of Ser. No. 165,184, Jul. 1, 1980, abandoned.

[30] Foreign Application Priority Data

Jul. 9, 1979 [CS]   Czechoslovakia ..................... 4807-79

[51] Int. Cl.$^3$ .............................................. C01B 33/16
[52] U.S. Cl. ..................................... 423/338; 252/451
[58] Field of Search ................. 423/338; 252/451, 317

[56] References Cited

U.S. PATENT DOCUMENTS

| | | | |
|---|---|---|---|
| 3,526,603 | 9/1970 | Acker | 423/338 X |
| 3,819,811 | 6/1974 | Aboutbovl et al. | 423/338 |
| 3,959,174 | 5/1976 | Winyall et al. | 423/338 X |
| 3,977,993 | 8/1976 | Lynch | 423/338 X |
| 4,089,932 | 5/1978 | Morita et al. | 423/338 |
| 4,169,926 | 10/1979 | McDaniel | 423/338 X |
| 4,206,297 | 6/1980 | Hoff et al. | 423/338 X |
| 4,246,139 | 1/1981 | Witt | 252/451 |
| 4,301,034 | 11/1981 | McDaniel | 423/338 X |

Primary Examiner—Jack Cooper

[57] ABSTRACT

The product of this invention can be applied as a column packing for high performance liquid chromatography. This material is further useful as a catalyst carrier, as a sorbent for selective concentrating diluted compounds for analytical purposes, and for immobilizing enzymes and the like. The invention discloses a process for producing silicic acid xerogel matrix with a volume of pores up to 4.0 cm$^3$g$^{-1}$ or even more, which process consists in that the starting soft and elastic silica hydrogel is subjected to combined effect of successive hardening in concentrated solutions of strong inorganic or organic acids, such as, for example, sulphuric acid, hydrochloric, phosphoric, nitric or trichloroacetic acids at ambient or elevated temperatures followed by acting in water-miscible solvents, such as, for example, in alcohols or ketones, and finally, by acting in water-immiscible solvents, such as, for example, in benzene, toluene, $C_5$ to $C_{12}$ hydrocarbons or carbon tetrachloride.

5 Claims, No Drawings and up to 1.5 cm$^3$g$^{-1}$ at the most.
PROCESS FOR PRODUCING XEROGEL OF SILICIC ACID WITH HIGH VOLUME OF PORES This application is a continuation-in-part of application Ser. No. 165,184, filed July 1, 1980, now abandoned.

BACKGROUND OF THE INVENTION

The invention relates to a process for producing xerogel of silicic acid with high volume of pores applicable especially for high performance liquid chromatography.

Employment of polymeric silicic acid/silica gel as column packing in liquid chromatography utilizes mainly high mechanical strength and stability of this material which, with spherical particles of similar size, and with sufficient volume of pores of suitable size, ensures high homogeneity and performance of the packing. Constant volume and shape of silica gel particles also makes it possible to change the eluent in the column without causing any macroscopic alterations of chromatographic bed volume and formation of heterogeneities.

The specific volume of pores is one of the important criteria for suitability of these materials. The higher the volume of pores, the higher the selectivity in gel permeation chromatography and the sample capacity in sorption liquid chromatography which can be reached at separation. This means that an equal separation effect can be achieved with a smaller column; in other words within a shorter time and with smaller eluent volume. At present, the volume of pores of the commercially available silica gel materials is mostly 0.5 to 0.8 cm$^3$g$^{-1}$ and up to 1.5 cm$^3$g$^{-1}$ at the most.

There are known in the prior art the processes for preparation of silica gels with higher volume of pores. For example, U.S. Pat. No. 3,526,603 discloses treating the silica gel with hot ammonia. Mineral acid or any medium strength acid is added for neutralizing the ammonia or for removing the salt excess. Such prepared silica gels have only medium pore size up to 1.25 ml g$^{-1}$.

Unger and Scharf (J. Coll. Interface Sci. 55, (1976), 371), on the other hand, prepared on laboratory scale silica gels with specific volumes up to 4 ml g$^{-1}$, but they used an expensive raw material—polyethoxysilane—and pretentious, hardly reproducible in technological scale, technique.

The main problem in obtaining aerogels with high volume of pores, using a cheap and readily available raw material—alkali metal silicates—as a source of silicic acid, is connected with the insufficient mechanical strength of silica hydrogel which is formed by polymerization of silicic acid in the first step of the process. Said hydrogel contains large amount water located in pores, which must be removed. However, water, because of both its high dipole moment and surface tension, causes extensive shrinkage of soft silica matrix during conventional drying and, consequently, substantial decrease of pore volume of resulting aerogel.

This disadvantage is partially overcome in different manner. Thus, for example, in U.S. Pat. No. 3,652,216 the hydrogel is washed and dried by long-time azeotropic distillation with water-immiscible solvent. U.S. Pat. No. 3,652,214 removes all water present in the hydrogen through vacuum sublimation after freezing it to such temperature that all water in pores is in a frozen state or, replacing it with organic solvent prior drying. Also in U.S. Pat. No. 3,819,811 which discloses a process of silica gel preparation by critically controlled steps of precipitation by neutralizing an alkaline silicate solutions with diluted mineral acids, ageing the hydrogel slurry at pH ranging from 3 to 8, washing with solutions of salts which displace acid-base salts, e.g. with aluminium chloride, ammonium chloride, or nitrate, or with diluted water solutions of mineral acids in which pH values does not fall below 3. The water from the hydrogel is displaced again either by washing with organic water-miscible liquids or by freeze drying technique or by azeotropic distillation.

According to U.S. Pat. No. 4,206,297 the silica hydrogel which is formed by reacting an organosilicate ester with diluted mineral acid—alcohol containing solutions at strictly controlled conditions (time, temperature, pH value) is washed with water-miscible solvents and dryied. Similarly, in U.S. Pat. No. 4,169,926 is disclosed contacting the silica-containing hydrogels with organic oxygen-containing water miscible solvents alone, or in a mixture with a normally liquid hydrocarbons or in combination with said hydrocarbons plus a minor amount of surfactants or their mixtures, followed by drying to get improved pore volumes of said silica-containing gels.

U.S. Pat. No. 4,089,932 relates to process of production of spherical silica gel comprising emulsification and acidification in a mixture of polar and non-polar organic solvent, washing with alcohols or ketones and drying and heating.

Another way to overcome the shrinking effect during drying is described in U.S. Pat. No. 3,977,993, which involves washing silica hydrogel with diluted solution of acid or ammonium salt to free it from alkali metal ions, followed by displacing water from the hydrogel by solvents miscible with water and heating to a temperature exceeding the critical temperature of the said organic solvent in an autoclave.

Some other processes known in the prior art disclose influencing the soft silica hydrogel matrix as, for example, in U.S. Pat. No. 3,959,174 where the silica gel is prepared in the presence of desolubizing agent as ammonia, sodium sulphate, and other inorganic salts, as well as some organic substances. Washing in acetone is used for dewatering. Also in U.S. Pat. No. 4,104,363 the strength of hydrogel is increased by hydrothermal treatment or by heating in neutral organic solvents.

The above procedure lead to the silicagels with increased volume of pores—till 3.0 cm$^3$/g at the most which is still relatively far from the values needed for special chromatographic applications.

OBJECT OF THE INVENTION

The object of this invention is to provide a process for the preparation of silicic acid xerogel matrix with volume of pores up to 4.0 cm$^3$g$^{-1}$ or even more.

The further object of this invention is to prepare silica support with high volume of pores to be used in liquid chromatography, especially in high performance liquid chromatography for special applications.

DESCRIPTION OF THE INVENTION

The process of this invention consists in that the starting soft and elastic hydrogel is hardened in concentrated solutions of mineral acids or strong organic acids, such as, for example, sulphuric acid, hydrochloric acid, phosphoric, nitric or chloroacetic acids by ageing for prolonged period of time and at ambient or, more preferably, at elevated temperatures. The amount of acid for hardening the silica hydrogel is governed by the amount of hydrogel added and by starting concentration of acid used. In general, after its addition, the final concentration of said acid in the hydrogel-acid mixture is to be higher than 20 wt %, so that utilization of concentrated starting solution of acid is highly preferred; i.e. at least of 90 wt % sulphuric acid, 37 wt % hydrochloric acid, 65 wt % nitric acid, 55 wt % phosphoric acid, about 98 wt % trichloroacetic acid should be used. Using these recommended starting acid concentrations, the volume ratio of said acid added to hydrogel is usually about 2:3 in case of sulphuric and trichloroacetic acids, in case of hydrochloric, nitric and phosphoric acids the volume ratio of acid to hydrogel should be at least 1:1, so that the acid-hydrogel mixture is strongly acidic with the pH value far below 1. The hydrogel-acid mixture is allowed to age at ambient or, more preferably, at elevated temperatures up to the boiling point of the said mixture for sufficient time which, generally, is controlled by temperature of ageing. The higher is temperature, the shorter time is necessary for hardening.

After washing out the acid, most preferably with water, the hardening effect of strong acid is extended in the next step by substituting the liquid aqueous phase, with its high polarity and surface tension in the gel matrix, for a phase with lower polarity and surface tension, which phase advantageously influences the matrix shrinkage at drying in such a manner that the water in the hydrogel pores is removed by gradual washing out and replacing with an organic water-miscible solvent, such as, for example, methanol, ethanol, acetone, dioxane and tetrahydrofuran.

In further step the forming of material with extraordinary high volume of pores is completed by washing the silica gel matrix with non-polar water-immiscible solvents, preferably with benzene, toluene, carbon tetrachloride, hexane or light $C_5$ to $C_{12}$ hydrocarbons which replace water-miscible solvents and remaining traces of water. Sufficient acting time is allotted to obtain penetration of the solvent into the pores of the gel so that a lyogel would be formed.

After reaction with these organic solvents, the product is freed from solvent residues by usual drying. Then, it is stabilized and set by calcining at temperatures of up to 950° C., preferably at temperatures from 700° to 750° C. to prevent substantial shrinking of the matrix when the silica gel is rewetted.

The xerogel of silica acid with high volume of pores can be used mainly as column packing for high performance liquid chromatography, but also is useful as a filler in polymer industry, as catalyst carrier, for immobilizing enzymes, for sorption processes, including trapping and removing toxic compounds, and the like.

The following examples further illustrate embodiments of the process according to this invention without intending any limitation of the scope of the invention.

EXAMPLE 1

Solution prepared by mixing 100 ml of water glass having density 35° to 38° Be with 200 ml of water and 20 ml of glacial acetic acid is suspended in a reactor in a mixture of 600 ml of carbon tetrachloride and hexane in ratio 1:1. Under intensive stirring, it is heated to 60° C. and stirred at this temperature for 15 minutes. The resulting reaction mass is separated by filtration, and washed at first with acetone and then with water. The filtration cake is transferred to a vessel containing 400 ml 65% nitric acid and the whole is heated to the boiling point of the mixture and allowed to stand at ambient temperature for 24 hours. After filtration and washing out with water, the hydrogel cake is acted first with 800 ml of methanol and after filtration of methanol with 500 ml of carbon tetrachloride. After drying at 80° C., the gel is calcined at 700° C. The volume of pores of the thus prepared microspherical material is 4.05 $cm^3g^{-1}$.

EXAMPLE 2

800 ml solution of sodium silicate, neutralized with diluted hydrochloric acid to pH=10–11, and containing 6.2% of silicon dioxide, was suspended in 1500 ml of polydimethyl siloxane having an average relative molecular mass of $10^4$, and was held in the resulting suspension for 10 minutes under stirring. Microspherical hydrogel of silicic acid was formed. After dilution with 1500 ml of n-heptane, silica gel was filtered off. On the filter, remaining polydimethyl siloxane was removed by washing successively with n-heptane, acetone and water. The hydrogel was then mixed with 500 g of trichloroacetic acid, which was allowed to dissolve under stirring in superfluous water from the hydrogel pores and aged at ambient temperature for 18 hours. After removing the trichloroacetic acid by filtration and washing with water, the hydrogel on the filter was acted with small portions of a total of 800 ml of tetrahydrofuran and then 600 ml of toluene. After removing residues of organic solvent by drying at 90° C., the material was annealed at 750° C. The volume of pores of this microspherical silica gel is 2.50 $cm^3g^{-1}$.

EXAMPLE 3

Hydrogel of silic acid, prepared by mixing of 100 ml water glass solution having a density of 35° to 38° Be with 150 ml of water and 50 ml of 8 wt % sulphuric acid, is aged with 300 ml of concentrated phosphoric acid, 55% concentration, at a temperature of 70° C. for 6 hours. After washing out the acid, the hydrogel on the filter was acted with small portions of a total of 1000 ml of dioxane and then 600 ml of benzene. After drying, the material was annealed at a temperature of 250° C. The volume of pores of the resulting material is 3.00 $cm^3g^{-1}$.

EXAMPLE 4

300 ml of a freshly mixed solution of sodium silicate, having pH=12 adjusted with diluted sulphuric acid and a silicon dioxide content of 8.6%, is poured into 800 ml of propylated trimethylol propane having an average relative molecular mass of $5\times10^3$. The suspension is intensively agitated for a short time, and allowed to stand for two hours to form silica hydrogel microspheres. It is then diluted with 1000 ml of 96% ethanol and the propylated trimethylol propane is removed by filtration and washing out with a further 800 ml of ethanol. The material is transferred from the filter to 300 ml of concentrated 96 wt % sulphuric acid which is intensively stirred during addition of hydrogel. The acid-hydrogel slurry is aged overnight. After dilution with water and decantation, the hydrogel on the filter is washed out with water for thorough removal of acid residues. The water is displaced with small portions of added acetone and then reacted with carbon tetrachloride. The material is dried and annealed at 200° C. The volume of pores of microspherical silica gel prepared by this process was 4.10 cm$^3$g$^{-1}$.

EXAMPLE 5

450 ml of concentrated hydrochloric acid (37% concentration) is added to hydrogel of silicic acid prepared by mixing 100 ml of water glass having density of 38° Be, 150 ml of water and 50 ml of 6% sulphuric acid; and the mixture is heated to boiling under intensive stirring and left ageing for 3 hours at the boiling point. After washing out the acid with water, the hydrogel is acted first with 600 ml of acetone and then with 400 ml of n-heptane. The gel is dried at 80° C. and annealed at 200° C. The volume of pores of this material reached 4.15 cm$^3$g$^{-1}$.

EXAMPLE 6

300 ml of 96 wt % sulphuric acid is added to hydrogel of silicic acid formed by mixing 200 ml of 38° Be water glass, 200 ml of water and 250 ml of 5% sulphuric acid and, after stirring, the acid-hydrogel mixture is left ageing for 18 hours. Then the mixture is filtered through a funnel with sintered glass filter and the acid is removed by washing out with water. The hydrogel is then acted with small portions of a total of 800 ml of ethanol and finally with 700 ml of C$_5$–C$_{12}$ light hydrocarbons mixture. The material was, after drying, annealed at a temperature of 900° C. The volume of pores of this material reached 2.80 cm$^3$g$^{-1}$.

EXAMPLES 7-10

This series of examples illustrates the hardening effect and subsequent successive action of water-miscible and non-miscible solvent on resulting properties of silica gel produced. The starting silica hydrogel was prepared by procedure according to Example 3.

Example 7 refere to the hydrogel washed out from mineral salts by water only, dried at 110° C. and annealed at 750° C. In Example 8 the starting hydrogel was hardened by ageing in sulphuric acid, then washed out by water to remove acid, dried at 110° C. and annealed at 750° C. In Example 9 the sulphuric acid-treated hydrogel after washing out by water is acted with ethylalkohol as water-miscible solvent, then dried at 110° C. and annealed at 750° C. Example 10 shows the effect of combined action of acid, ethanol as water-miscible solvent, and toluene as water-immiscible solvent, after drying at 110° C. and annealing at 750° C.

Table I summarizes the data (within experimental error):

TABLE I

| Example No | After Drying at 110° C. | | After Annealing at 750° C. | |
|---|---|---|---|---|
| | Surface Area m$^2$g$^{-1}$ | Pore Volume cm$^3$g$^{-1}$ | Surface Area m$^2$g$^{-1}$ | Pore Volume cm$^3$g$^{-1}$ |
| 7 | 265 | 0.62 | 229 | 0.61 |
| 8 | 234 | 1.92 | 241 | 1.82 |
| 9 | 237 | 2.50 | 246 | 2.30 |

TABLE I-continued

| Example No | After Drying at 110° C. | | After Annealing at 750° C. | |
|---|---|---|---|---|
| | Surface Area m$^2$g$^{-1}$ | Pore Volume cm$^3$g$^{-1}$ | Surface Area m$^2$g$^{-1}$ | Pore Volume cm$^3$g$^{-1}$ |
| 10 | 248 | 3.78 | 227 | 3.86 |

EXAMPLES 11-14

This series of examples illustrates the result of strenghtening the silica gel structure, stabilizing, by heating at higher temperatures. The procedure of examples 7 to 10 is followed, with addition that, after appropriate drying and/or heating, the gel is rewashed in water and again dried at 110° C.

Table II illustrates the results obtained:

TABLE II

| Examples | Starting Gel from Example No | Rewashed and Dried After First | Pore Volume cm$^3$g$^{-1}$ |
|---|---|---|---|
| 11 | 7 | Drying at 110° C. | 0.62 |
| | | Heating at 750° C. | 0.56 |
| 12 | 8 | Drying at 110° C. | 1.13 |
| | | Heating at 750° C. | 1.79 |
| 13 | 9 | Drying at 110° C. | 1.21 |
| | | Heating at 750° C. | 2.33 |
| 14 | 10 | Drying at 110° C. | 1.27 |
| | | Heating at 750° C. | 3.86 |

What is claimed is:

1. A process for producing xerogel of silicic acid with a high volume of pores, consisting essentially of:
   (A) hardening wet hydrogel of polymeric silicic acid by aging for about 3 to 24 hours in a concentrated acid selected from the group consisting of sulphuric, hydrochloric, phosphoric, nitric and trichloracetic acids, the minimum concentrations thereof being 90 wt %, 37 wt %, 55 wt %, 65 wt % and 98 wt %, respectively, the amount of acid being such that the final concentration of said acid in the acid-hydrogel mixture is higher than 20 wt %,
   (b) removing said mineral or organic acid by washing and subsequently washing the hydrogel with an organic water-miscible solvent followed by washing with an organic water-immiscible solvent, thereby forming a lyogel,
   (c) stabilizing said lyogel by heating and annealing at temperatures of from 200° to 950° C., wherein the xerogel produced has a higher pore volume than an xerogel produced according to said process absent the washing step with the organic water-immiscible solvent.

2. The process of claim 1, wherein the aging is effected at temperatures of from 20° to 95° C.

3. The process of claim 1, wherein said organic water-miscible solvent is selected from the group consisting of methanol, ethanol, acetone, dioxane and tetrahydrofuran.

4. The process of claim 1, wherein said water-immiscible solvents is selected from the group consisting of benzene, toluene, C$_5$ to C$_{12}$ light hydrocarbons and carbon tetrachloride.

5. The process of claim 1, wherein the annealing of said silica lyogel is effected at a temperature of from 700° to 750° C.

* * * * *